United States Patent [19]

Bubik

[11] Patent Number: 4,874,285
[45] Date of Patent: Oct. 17, 1989

[54] LOW PROFILE VEHICLE LIFTING AND TOWING DEVICE

[75] Inventor: Leslie Bubik, Toronto, Canada

[73] Assignee: Vulcan Equipment Company, Ontario, Canada

[21] Appl. No.: 200,795

[22] Filed: Jun. 1, 1988

[51] Int. Cl.$^4$ ............................................. B60P 3/12
[52] U.S. Cl. .................................. 414/563; 280/402; 414/718; 294/815; 294/904
[58] Field of Search ................ 414/563, 718; 280/402; 294/904, 81.5

[56] References Cited

U.S. PATENT DOCUMENTS

| | | | |
|---|---|---|---|
| 3,327,879 | 6/1967 | Lull | 414/718 X |
| 4,045,936 | 9/1977 | Sterner | 414/718 X |
| 4,147,263 | 4/1979 | Frederick et al. | 414/718 |
| 4,634,337 | 1/1987 | Hamman | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,737,066 | 4/1988 | Allison, Jr. | 414/563 |
| 4,741,661 | 5/1988 | Carey | 280/402 X |

Primary Examiner—Robert J. Spar
Assistant Examiner—Robert Katz
Attorney, Agent, or Firm—Niro, Scavone, Haller & Niro Ltd.

[57] ABSTRACT

The present invention relates to a vehicle lifting and towing device and particularly to an improved low profile lifting and towing device capable of efficient placement of the lower lifting boom while providing added ballast against the tipping moment of the towing vehicle, as well as a column configuration permitting the upper boom to be generally horizontal providing improved driver vision from the cab of the towing vehicle.

11 Claims, 4 Drawing Sheets

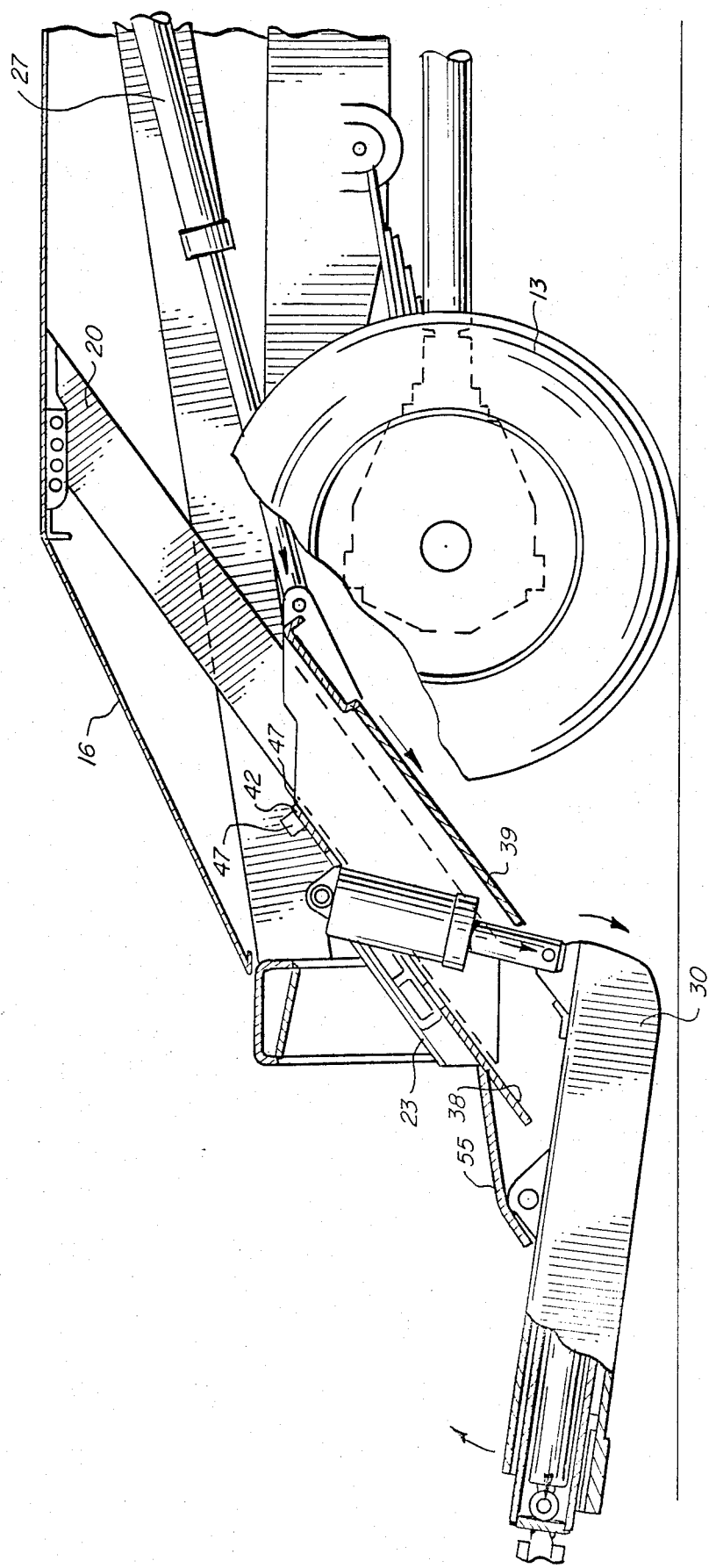

LOW PROFILE VEHICLE LIFTING AND TOWING DEVICE

BACKGROUND OF THE INVENTION

The present invention relates generally to a vehicle lifting and towing apparatus and, more particularly, to an improved low profile vehicle lifting and towing device having a carriage slidable along an inclined column to orient a lifting boom along a vertical and horizontal path rearwardly from the towing vehicle.

Because newer automobiles are being produced with plastic bumpers, air foils and fender flares, and because of the ease of operation in a variety of towing conditions, there is an increased demand for wheel lift tow trucks. Today's wheel lift tow trucks typically use a lower or lifting boom upon which the wheel lift assemblies are mounted. The lifting boom is generally horizontally extendible and tiltable on a vertical arc which enables the disabled vehicle to be lifted from underneath the chassis by the wheels in a variety of situations. As a result, wheel lift tow trucks are now recognized to provide many advantages over conventional tow trucks using only overhead boom and sling arrangements.

Known lower boom lifting and towing assemblies fall into two general categories. One type has a lower boom which pivots about a stationary pivot point or is attached with a mechanical parallelogram linkage to a stationary frame member. Another type utilizes an inclined column which enables the lifting boom to move along the inclined column from a retracted position to an extended position downward and outward from the rear of the towing vehicle.

For example, the towing apparatus disclosed in U.S. Pat. No. 4,679,978 is a type which pivots the lower boom by the use of a parallelogram linkage about a stationary frame member. There are, however, several disadvantages associated with the lifting and towing apparatus of this type. Notably, because of the geometrical constraints of the parallelogram linkage, the maximum horizontal extension of the lifting boom from the rear of the towing vehicle is limited. Similarly, devices of this type have decreased arc of vertical tilt of the lifting boom. These deficiencies reduce the effectiveness of the operation of the apparatus under certain towing conditions. Further, when a device of this type is in its fully retracted position, the lifting boom (and associated wheel lift) protrudes out from the rear end of the towing vehicle further than desirable. Additionally, towing apparatus of this type have increased weight behind the centerline of the rear wheels of the towing vehicle which decreases the amount of weight that can actually be lifted before the front wheels of the towing vehicle start to lift off of the ground. In other words, these towing apparatus undesirably increase the tipping moment of the towing vehicle.

Another general category of lower boom lifting and towing assemblies is that disclosed in U.S. Pat. No. 4,634,337, which incorporates an inclined column arrangement. While overcoming some of the disadvantages of the above type of lifting and towing assembly, the design of this type has several drawbacks and disadvantages, produced in part as a result of the lifting cylinder being operably and directly connected to the lifting boom housing. In this configuration, the lifting cylinder is collinear with the housed within the inclined column. As a result, in order to achieve the desired range of vertical movement of the lifting boom, it is necessary to have the column protrude above the deck of the towing vehicle in a traditional deck situation (or, alternatively, having to enclose the inclined column in a raised deck). Because the column protrudes through or above the traditional deck, the movement of the upper boom is impeded at its lowermost position. This obstructs the driver's vision from the cab of the towing vehicle, which reduces the efficient operation or placement of the lifting boom from the cab of the towing vehicle, as well as reducing general driving safety. An like the devices utilizing a parallelogram linkage, devices of the known inclined column type also have increased weight behind the centerline of the rear wheel of the towing vehicle undesirably increasing the tipping movement of the towing vehicle.

SUMMARY OF THE INVENTION

The present invention preserves the advantages of known vehicle lifting and towing devices. In addition, it provides new advantages not found in currently available devices and overcome many of the disadvantages associated with the known devices.

Therefore, an object of the present invention is to provide a low profile vehicle lifting and towing device.

Another object of the present invention is to provide an improved vehicle lifting and towing device that enables increased horizontal reach when fully extended and minimized horizontal protrusion from the rear of the towing vehicle when fully retracted.

A further object of the present invention is to provide an improved inclined column lifting and towing device by positioning the main lifting cylinders in a generally horizontal orientation forward of the centerline of the rear wheels of the towing vehicle providing added ballast in opposition to the tipping moment of the towing vehicle when lifting a load.

An additional object of the present invention is to provide an improved low profile vehicle lifting and towing device having an inclined column that does not protrude above the deck of the towing vehicle like other devices utilizing inclined column assemblies while at the same time providing increased range of horizontal and vertical movement of the lifting boom.

Yet another object of the present invention is to provide an improved inclined column lifting and towing device that permits adequate horizontal displacement over the range of vertical lift.

Yet a further object of the present invention is to provide an improved vehicle lifting and towing device that eliminates many of the undesirable forces acting on pivot points of parallelogram lifting and towing assemblies providing greater reliability and decreased manufacturing costs.

Yet an additional object of the present invention is to provide an improved inclined column vehicle lifting and towing device that has lifting cylinders that are not collinearly mounted with the inclined column.

Still another object of the present invention is to provide an improved inclined column vehicle lifting and towing device that has a column inclined at a more acute horizontal angle relative to the ground providing increased horizontal reach when fully extended and decreased protrusion from the rear of the towing vehicle when fully retracted.

Still a further object of the present invention is to provide an improved inclined column vehicle lifting and towing device that does not directly connect the lifting cylinders to the lifting boom housing.

An important object of the present invention is to provide a low profile vehicle lifting and towing device which is substantially and significantly improved in both structure and function from other inclined column vehicle lifting and towing devices known in the prior art, such as that disclosed in U.S. Pat. No. 4,634,337.

In accordance with the present invention, a vehicle lifting and towing device is provided utilizing an improved inclined column assembly. This assembly includes a stationary column secured to the chassis of the towing vehicle and inclined from its upper forward end toward its lower rear end, a carriage slidably engaging the column and a lifting boom housing pivotally connected to the carriage. The present invention further includes at least one lifting cylinder pivotally connected at one end to the upper forward portion of the carriage and at the other end to the chassis of the towing vehicle at a forward point remote from the inclined column. Also included is a tilt cylinder attached at one end to the carriage and pivotally attached at the other end to a generally forward end of the lifting boom housing. The lifting boom housing supports a multisectional horizontally extendable hydraulically powered lower boom. According to the present invention, as the lifting cylinders are extended, the carriage and lifting boom housing are moved downward and rearward along the column, the lifting cylinders thereby moving through a generally vertical arc as they travel with the carriage through its range of movement along the column. Likewise, when the lifting cylinders are retracted, the carriage, lifting boom housing and, hence, lifting boom are moved generally forward and upward along the inclined column. When the tilt cylinder is operated, the lifting boom housing and lifting boom are pivoted or tilted through a generally vertical arc.

BRIEF DESCRIPTION OF THE DRAWINGS

These and other features, objects and advantages of the present invention will become apparent from the following description and drawings wherein like reference numerals represent like elements in the several views, and in which:

FIG. 5 is a side elevational view of the present invention shown with the carriage in an extended position and illustrating operation of the tilting of the lifting boom.

DETAILED DESCRIPTION OF THE PREFERRED EMBODIMENTS

Figure 1:
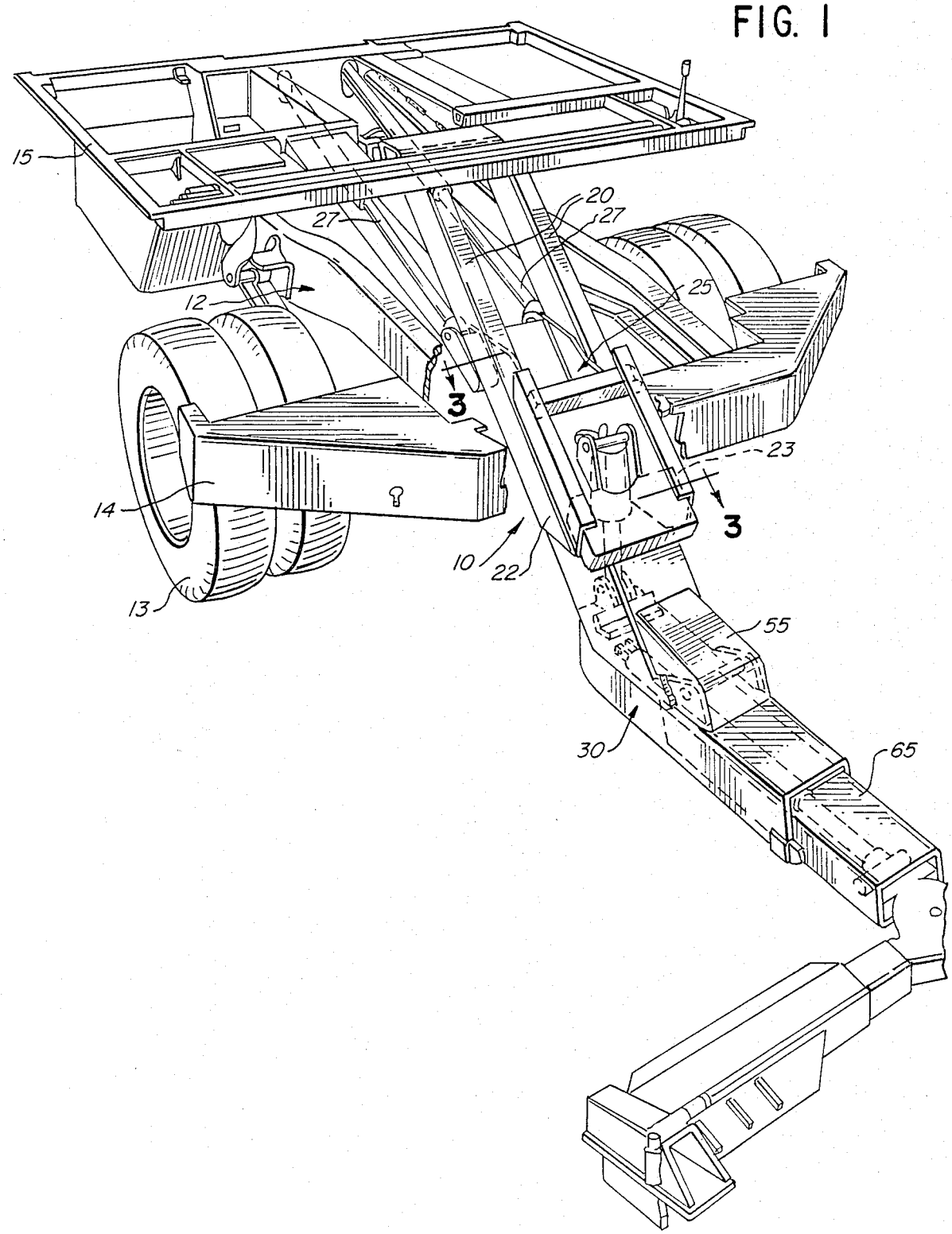
FIG. 1 is a perspective view of the rear of a towing vehicle with the traditional decking removed to show the arrangement of the components of the vehicle lifting and towing device of the present invention.

The improved vehicle lifting and towing device of the present invention is shown generally as 10 in FIG. 1. As can be seen, it is an integral part of a towing vehicle shown generally as 12. The towing vehicle includes a pair of rear wheels 13, a rear bumper 14 and a chassis assembly 15 upon which the deck 16 (see FIGS. 4 and 5) is placed. Throughout the specification and claims, reference is made to generally rearward, forward, upper and lower locations. Forward used herein refers to a direction toward the front of the towing vehicle and rearward refers to a direction toward the rear of the towing vehicle. As used herein, upward refers to a location generally toward the deck 16 of towing vehicle and downward refers to a location generally towards the ground or road surface (not shown) upon which the rear wheels 13 of the towing vehicle contact.

The improved vehicle lifting and towing device of the present invention provides an inclined column which is composed of two generally rectangular rails 20. Rails 20 are fixed at ends 21 to the chassis 12 and extend to free ends 22. Rails 20 are inclined at an angle generally downward and rearward from ends 21 to free ends 22. Rails 20 can be secured to chassis 12 at an intermediate point along their length to provide added stability. The free ends 22 of rails 20 have guide channel members 23 rigidly secured to the top of rails 20, the purpose and function of which will be hereinafter described.

The present invention also includes a carriage 25. Carriage 25 is moveable along rails 20 by the use of a pair of lifting cylinders 27. A lifting boom housing 30 is pivotally connected to the lower portion of carriage 25. Generally, when lifting cylinders 27 are extended (as shown in FIG. 1), carriage 25 is slidably moved downward and rearward along rails 20. Necessarily, lifting boom housing 30 is also moved downward and outward from the rear of a towing vehicle chassis 12.

Figure 2:
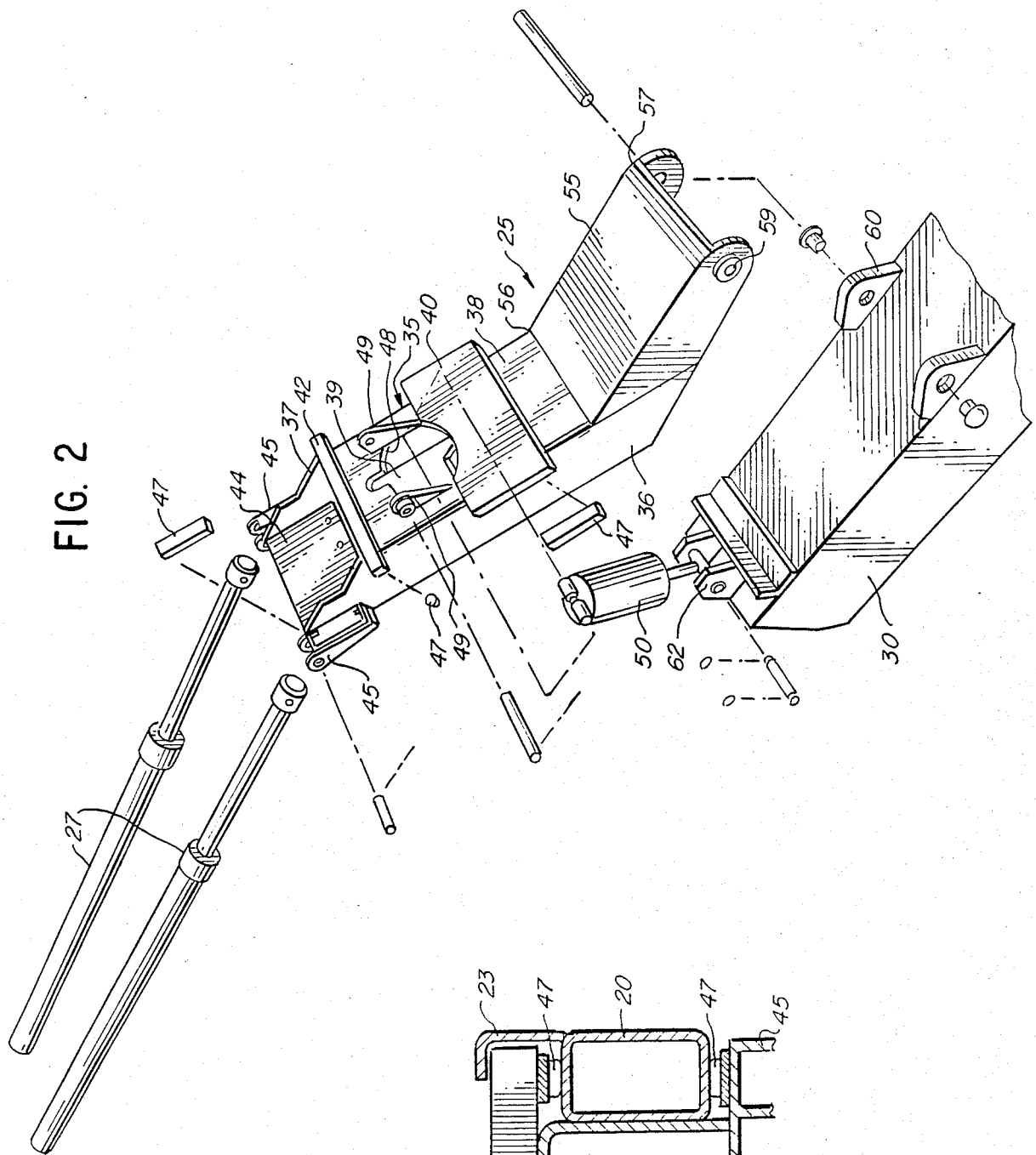
FIG. 2 is an exploded perspective view of the present invention without the inclined column, but showing the lifting cylinders, carriage, tilt cylinder and lifting boom housing.

The construction of carriage 25 can best be understood by reference to FIG. 2. Carriage 25 consists of a rectangular member 35 having two side plates 36 and 37, a top plate 38 and a bottom plate 39 (not shown in FIG. 2). Rectangular member 35 is sized, as will be understood by those of ordinary skill in the art, to nest between rails 20 which form the inclined column. Carriage 25 is maintained within and slidable upon rails 20 with the use of guide plates 40, 42 and 44. Guide plates 40, 42 and 44 act to retain the carriage 25 between rails 20.

Specifically, guide plate 40 is secured across the width of top plate 38 extending beyond the edges of side plates 36 and 37 of rectangular member 35. Guide plate 40 is positioned on carriage 25 at a point generally toward the bottom rearward portion of carriage 25 and bears the load during operation of the device. Plate 42 is secured across the generally upper rearward portion of carriage 25 and extends beyond the side plates 36 and 37 of rectangular member 35.

Bottom guide plate 44 is secured to the upper forward portion of carriage 25 on bottom plate 39 and also extends beyond the edges of side plates 36 and 37 of rectangular member 35. Bottom guide plate 44 also provides pivotal connections or ears 45 which enable lifting cylinders 27 to be operably connected to the carriage 25. Ears 45 are located on the flanges of top guide plate 44 which extend beyond the edges created by side plates 36 and 37 of rectangular member 35. Also provided on the contact surfaces of top guide plates 40 and 42 and bottom guide plate 44 are bearing pads 47 to reduce the friction of the carriage 25 as it moves along rails 20. In this manner, carriage 25 is secured between and upon rails 20.

Figure 3:
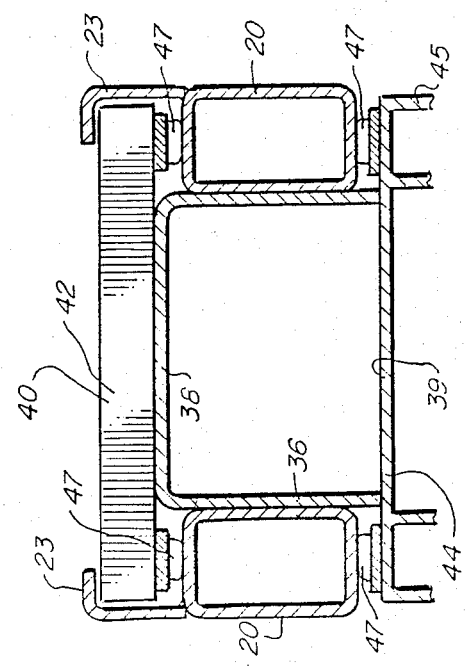
FIG. 3 is a cross-sectional view of the carriage and column of the present invention, taken along line 3—3 of FIG. 1 to show the carriage mounted within the rails of the inclined column.

With reference to FIG. 3, the positioning of carriage 25 within rails 20 can be understood. As can be seen, rails 20 are sandwiched between upper guide plates 40 and 42. The section of FIG. 3 is taken along two points (see FIG. 1) so that top guide plates 40 and 42 can be seen along with bottom guide plate 44. Thus, rectangular member 35 (i.e., top, bottom and side plates 38, 39, 36 and 37) are between rails 20. Top guide plates 40 and 42 (shown in an optional enclosed configuration as hereinafter described) slidably secures carriage 25 to the top of rails 20. Similarly, bottom guide plate 44 secures the carriage 25 to the bottom of rails 20. (Ears 45 are also partially shown in FIG. 3). Thus, the carriage 25 is slidable within and upon rails 20, with a reduction of friction being achieved through the use of bearing pads 47. As will be understood by those of ordinary skill in the art, the size of the components of the carriage 25 are such that it is operable along rails 20, allowing for acceptable manufacturing tolerances.

Again with reference to FIG. 2, top plate 38 rectangular member 35 is provided with a bore 48 and two pivotal connections or ears 49. The bore 48 is sized to receive a tilt cylinder 50 which is pivotally connected at one end to the ears 49. It will be understood by those of skill in the art that the other end of tilt cylinder 50 protrudes through the bottom of carriage 25 in a manner that permits pivoting of the lifting boom housing 30 as hereinafter described.

Also attached to carriage 25 is a rearwardly extending shoe 55. Shoe 55 is fixed at one end 56 to carriage 25 and extends therefrom rearwardly to a free end 57. Shoe 55 provides a fixed pivot point 59 for the lifting boom housing 30 at its free end 57. As can be see, lifting boom housing 30 provides a fixed pivot point or journal means 60 at a point generally rearward of the lifting boom housing 30. Also provided is a journal means 62 at the generally forward end of lifting boom housing 30. Thus, at the forward end, the tilt cylinder 50 is pivotally connected between journal means 62 and ear 49 of carriage 25. The generally rearward portion of lifting boom housing 30 is pivotally connected to shoe 55 at point 59 and journal means 60. In this manner, lifting boom housing 30 creates a teeter-totter effect about points 60 and 62 through the selective operation of tilt cylinder 50. It will be understood by those of ordinary skill in the art that within lifting boom housing 30 is a hydraulically powered, multi-sectional lifting boom 65 (see FIG. 2) which selectively extends outward and rearward of the towing vehicle in order to reach the vehicle to be towed in a variety of circumstances, and is moved along with the lifting boom housing 30.

Figure 4:
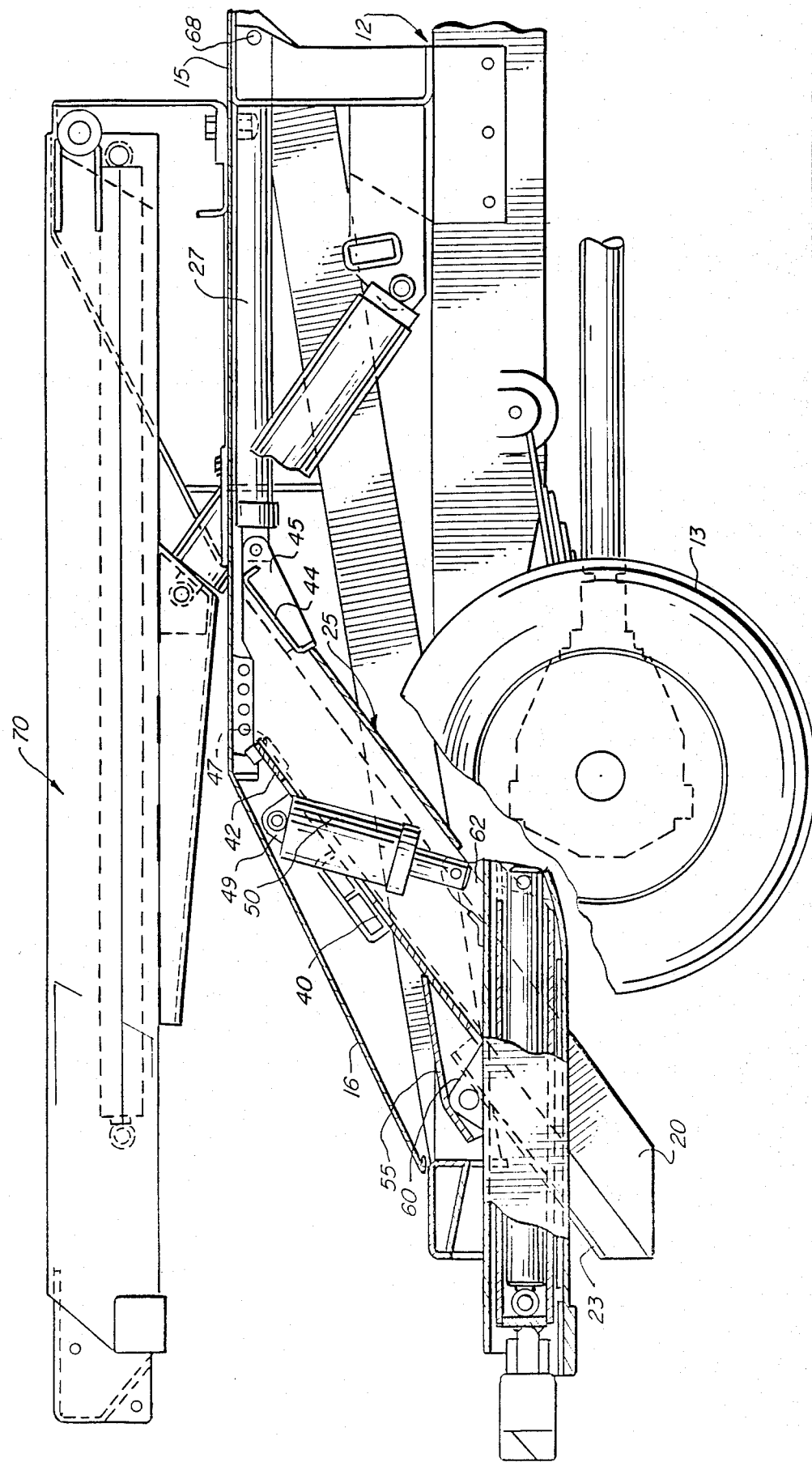
FIG. 4 is a side elevational view of the present invention with the carriage in a fully retracted position.

With reference to FIG. 4, the operation of the present invention will best be understood. FIG. 4 shows the carriage 25 and lifting boom housing 30 in its fully retracted position. Notably, rails 20 are sandwiched between guide plates 40, 42 and 44 and carrier 25 is operable within rails 20. Lifting cylinders 27 are remote from rails 20 and are pivotally connected to the forward and upper portion of carriage 25 on the ears 45 attached to plate 44. The other end of lifting cylinder 27 extends toward the front of the towing vehicle and are pivotally connected to the chassis 12 at point 68. As can be seen, tilt cylinder 50 is operably connected to carriage 25, and extends through the bottom of carriage 25 to operably engage the lifting boom housing 30.

By the use of the slidable carriage 25 and the remote lifting cylinder 27, it is not necessary to extend the rails 20 which form the inclined column above the deck 16 in order to achieve the desired range of movement of the lifting boom housing 30. In this fashion, a traditional upper boom 70 may be generally horizontal in its storage position, thereby minimizing the adverse effect on the driver's vision caused by the extended columns of the prior art. It will be understood by those of ordinary skill in the art that upper boom 70 is pivoted at a point substantially at deck 16 level and upper boom 70 will, thus, be below the rear window (not shown) of the towing vehicle. Additionally, the lifting cylinders 27 are generally forward of the centerline of the rear wheels 13 of the towing vehicle which not only reduces the tipping moment, but also adds ballast to help increase the amount of load that can be lifted.

FIG. 5 shows the carriage 25 and lifting boom housing 30 of the present invention in an extended position. As can be seen, carriage 25, through operation of lifting cylinders 27, is moved along rails 20 and downward and rearward from the towing vehicle. Efficient operation is thus achieved, as well as other advantages, such as increased ballast forward of the centerline of the wheels 13 of the towing vehicle and a low profile construction. The tilting action of the lower boom housing 30 is also illustrated.

In other embodiments of the present invention, a guide channel 23 is provided on rails 20 (See FIGS. 1, 4 and 5). This guide channel consists of right angle members positioned along the outside edges of rails 20 at a location covering the lower rearward portion of rails 20. These guide channels 23 prevent pinch points, as well as decreasing the possibility that objects can become lodged between the carriage 25 and the rails 20.

In other embodiments of the present invention, the area between the guide plates 40 and 42 of the carriage 25 can be boxed in or enclosed as shown in FIG. 1. Again, the chances of obstruction during operation are reduced, as well as the strength of the assemble being increase.

While the invention described herein is generally applicable to light duty towing vehicles, i.e., those generally known in the industry as one or one and one-half ton chassis, it will be understood that the present invention can be applied to other sized towing vehicles as well. For example, in the light duty towing vehicles, it has been determined that the column is inclined at an angle of between 38° and 48° relative to horizontal with approximately 43° being preferred. It will be understood by those of ordinary skill in the art that when the present invention is applied to larger towing vehicles, the angle at which the column is inclined can be increased or decreased according to the chassis configurations and use requirements, while at the same time enabling the desired low profile feature.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed is:

1. A vehicle lifting and towing device comprising:
    a column fixably attached to a chassis of a towing vehicle inclined downward and rearward from the towing vehicle at a fixed angle;
    a carriage slidably engaged with said column;
    a lifting boom housing pivotally connected to a lower rearward portion of the carriage;

at least one lifting cylinder mounted in non-collinear relationship to said column; said lifting cylinder being pivotally connected at one end to an upper forward portion of the carriage and extending toward the front of the towing vehicle and pivotally connected to the chassis of the towing vehicle at its opposite end; and a tilt cylinder having one end pivotally connected to and operable within the carriage and the other end pivotally connected to the lifting boom housing.

2. The device of claim 1 wherein the column includes two rails, each having an upper and lower end, the upper end rigidly secured to the chassis of the towing vehicle and the lower end extending downward towards the rear of the towing vehicle.

3. The device of claim 2 wherein the carriage is moveable rearward and downward along the rails of the column to a fully extended position as the lifting cylinder is extended and moveable forward and upward along the rails of the column to a fully retracted position as the lifting cylinder is retracted.

4. The device of claim 3 wherein the lifting boom housing is pivotally mounted at an intermediate point along its length to the carriage and the tilt cylinder pivotally and operably connected to the forward end of the lifting boom housing so that the lifting boom housing is moveable on an arc at its rearward end as the tilt cylinder is actuated.

5. The device of claim 4 wherein the carriage includes guide plates which secure the carriage substantially along the length of the rails of the column.

6. The device of claim 5 wherein bearing pads are provided on the guide plates to reduce friction between the carriage and the rails of the column during operation.

7. A vehicle lifting and towing apparatus comprising:
an inclined column attached to a chassis of a towing vehicle at a fixed angle, and extending down and rearward from said chassis;
a carriage slidably mounted to said column and movable between an upper retracted position and a lower extended position;
at least one lifting cylinder pivotally connected at one end to a forward upper portion of said carriage and at its other end to said chassis substantially forward of the rear wheels of the towing vehicle; said lifting cylinder extending forward from said carriage in a generally horizontal orientation when said carriage is in its upper retracted position; and said lifting cylinder being movable through an arc as said carriage travels along said column toward said lower extended position;
a lifting boom housing pivotally connected to a lower rearward portion of said carriage; and
a tilt cylinder connected at one end to said carriage and at its other end to the lifting boom housing.

8. The lifting and towing device of claim 7 further including a rear deck enclosing said column wherein the uppermost portion of the column is positioned at or below the chassis assembly upon which the deck is mounted, and further includes an upper boom which is movable from a lifting position to a substantially horizontal lower stowed position above the deck.

9. The lifting and towing apparatus of claim 8 wherein said column is attached to said chassis at an angle between 38° and 48° relative to horizontal.

10. The lifting and towing apparatus of claim 8 wherein said column is positioned substantially in-line with the centerline of said vehicle and said upper boom is substantially in-line with the centerline of said vehicle.

11. A vehicle lifting and towing device comprising:
a column mounted at a fixed angle to a chassis of a towing vehicle, said column having an upper forward end and a lower rearward end;
a carriage moveable along said column between said upper forward end and said lower rearward end;
a lifting boom housing supported by the carriage;
a power actuated means, positioned in noncollinear relationships to the carriage, for moving the carriage along the column and having one end connected to the carriage and other end connected to the chassis forward of the upper forward end of the column;
wherein a tilt cylinder is pivotally connected at one end to the carriage at a location above the column and at the other end to the forward end of the lifting boom housing at a location below and forward of the column, and wherein the lifting boom housing is also pivotally connected at an intermediate point along its length to a lower rearward portion of the carriage.

* * * * *